Patented Dec. 27, 1932

1,892,489

UNITED STATES PATENT OFFICE

ROBERT HALLER, OF RIEHEN NEAR BASEL, AND ALPHONSE HECKENDORN, OF BASEL, SWITZERLAND, ASSIGNORS TO SOCIETY OF CHEMICAL INDUSTRY IN BASLE, OF BASEL, SWITZERLAND

CELLULOSE DERIVATIVES CONTAINING NITROGEN AND PROCESS OF MAKING SAME

No Drawing. Application filed December 4, 1931, Serial No. 579,102, and in Switzerland December 10, 1930.

The present invention relates to the manufacture of cellulose derivatives containing nitrogen. It comprises the process of making these derivatives as well as the new products themselves.

In U. S. patent application Serial No. 430,122 filed February 20, 1930, is described a process for the manufacture of cellulose derivatives containing nitrogen by treating alkali cellulose with cyanogen chloride or cyanogen bromide. The products thus obtained are distinguished by a high affinity towards acid dyestuffs.

According to the present invention new cellulose derivatives are made by treating cellulose, whether swollen or unswollen, with a cyanide and then subjecting it to the action of a halogen. The swollen cellulose may be used for example in the form of regenerated cellulose or it may be obtained by treatment of ordinary cellulose with a caustic alkali or with another swelling agent (for example calcium chloride, zinc chloride or a sulphocyanide), the swelling agent being removed by washing. If desired, the swollen cellulose may be treated with the cyanide without previously removing the swelling agent, for example the alkali, from the fiber; it is also possible to combine into a single operation the treatment of the cellulose with the swelling agent and with the cyanide.

The new products always contain nitrogen and are distinguished by a high affinity towards acid dyestuffs. In some cases they may also contain halogen and then have also affinity towards basic dyestuffs. Generally the products have affinity towards acetate silk dyestuffs which are insoluble in water.

As parent materials of the invention there come into question the most varied forms of cellulose, such as cotton yarn, loose material, linters, regenerated cellulose, sulphite cellulose and the like.

The following examples illustrate the invention, the parts being by weight unless otherwise stated:—

Example 1

10 parts of cotton in the form of yarn or of artificial silk, for example viscose silk, are impregnated with an aqueous solution of potassium cyanide of 40 per cent strength. After removal of the excess of salt solution by centrifuging or pressing, the material is treated with chlorine at 0° C. in carbon tetrachloride until the chlorine is no longer absorbed. The fiber acquires a transitory brown color which again disappears towards the conclusion of the reaction. The product is rinsed first with water containing bisulphite and then with pure water. The product has a high affinity towards basic dyestuffs; it contains 0.95 per cent of nitrogen and has a small content of chlorine.

Example 2

10 parts of cotton are swollen by treatment with a caustic soda solution of 20 per cent strength and the soda solution is completely removed after one hour by washing. The fiber, without being dried, is then impregnated with a solution of potassium cyanide of 40 per cent strength, the further treatment being exactly as described in Example 1. The product has properties which are similar to those of the product of Example 1; it contains 1.36 per cent of nitrogen and has a small content of chlorine.

Example 3

10 parts of cotton (yarn, loose material or linters) are impregnated for half an hour with a mixture of 100 parts by volume each of caustic soda solution of 32 per cent strength, alcohol and water, to which have been added 65 parts of sodium cyanide. The material is pressed or centrifuged and then introduced into carbon tetrachloride, cooled to a temperature of 0° C. to −10° C. Chlorine is passed into the liquid until it is no longer absorbed, which may be recognized by a permanent yellow coloration of the carbon tetrachloride. The material is then washed, first with cold water containing thiosulfate or bisulfite and then with pure water. After drying, there is obtained a cellulose derivative containing 1.8 per cent of nitrogen and 1 per cent of chlorine. The product has a good affinity both towards acid dyestuffs and towards basic dyestuffs.

Instead of the impregnating liquid used in this example there may be used a purely aqueous liquid containing alkali and alkali cyanide, or a purely alcoholic liquid, insofar as the cyanide used is soluble therein. Instead of carbon tetrachloride there may be used another suitable organic diluent, such as chloroform or ether.

*Example 4*

Cotton is impregnated in the manner described in Example 3, pressed and then treated in carbon tetrachloride at 0° C. with bromine as long as the bromine is discolorized. After the reaction is completed the material is rinsed for a short time with a solution of sodium thiosulphate and then washed with water. The product contains 1.8 per cent of nitrogen and 1.45 per cent of bromine; it has a high affinity both towards acid dyestuffs and towards basic dyestuffs.

*Example 5*

Cellulose is impregnated in the manner described in Example 3, pressed and introduced into carbon tetrachloride. Iodine is then added until the fiber assumes a permanent brown coloration. The material is rinsed first with water containing sodium thiosulfate and then with pure water. The product so obtained contains 4 per cent of nitrogen but is practically free from iodine; it has a good affinity towards acid dyestuffs.

In Examples 3 to 5 there may be used instead of sodium cyanide another cyanide, such as potassium cyanide.

*Example 6*

Cotton which has been treated in the manner described in Example 3 or 4 is dyed according to one of the following processes:—

(a) In a bath containing 2 per cent of Tartrazine and 2 per cent of acetic acid of 10 per cent strength; the goods are entered at 30—40° C., the bath is heated to boiling and dyeing is conducted for ¾ to 1 hour. The fiber is thus dyed deep yellow. A similar result is obtained by dyeing in the same manner the product of Example 5.

(b) In a bath containing 1 per cent of Solid Green JJO and 1 per cent of acetic acid, dyeing being conducted in the manner usual in dyeing with basic dyestuffs. The material is thus dyed dark green. Similar results are obtained by dyeing in the same manner the product of Example 1 or Example 2.

(c) In a bath containing 2 per cent of Cibacet Violet 2R and 2—4 grams of Marseilles soap per liter of dye-bath; the bath is heated slowly to boiling and dyeing is conducted from ¾ to 1 hour. The material is dyed intense violet.

What we claim is:—

1. Process for the manufacture of cellulose derivatives containing nitrogen, comprising treating swollen cellulose with a cyanide and then with a halogen.

2. Process for the manufacture of cellulose derivatives containing nitrogen, consisting in treating cellulose simultaneously with a cyanide and an alkali and then with a halogen.

3. Process for the manufacture of cellulose derivatives containing nitrogen, consisting in treating cellulose simultaneously with a cyanide and an alkali and then with iodine.

4. As new products the cellulose derivatives containing nitrogen which are characterized by strong affinity for acid dyestuffs and which have been obtained by treating swollen cellulose with a cyanide and then with a halogen.

5. As a new product the cellulose derivative containing halogen and nitrogen and possessing a pronounced affinity for acid dyestuffs.

In witness whereof we have hereunto signed our names this 21st day of November, 1931.

ROBERT HALLER.
ALPHONSE HECKENDORN.